United States Patent
Osuka et al.

(10) Patent No.: US 7,428,847 B2
(45) Date of Patent: Sep. 30, 2008

(54) TORQUE DETECTION DEVICE

(75) Inventors: Akio Osuka, Kashihara (JP); Toshiharu Ishihara, Kashiwara (JP); Naoki Nakane, Toyota (JP)

(73) Assignees: JTEKT Corporation, Osaka-shi (JP); DENSO Corporation, Kariya-shi (JP)

( * ) Notice: Subject to any disclaimer, the term of this patent is extended or adjusted under 35 U.S.C. 154(b) by 70 days.

(21) Appl. No.: 11/652,033

(22) Filed: Jan. 11, 2007

(65) Prior Publication Data

US 2007/0169569 A1    Jul. 26, 2007

(30) Foreign Application Priority Data

Jan. 12, 2006   (JP)   ............................. 2006-005277

(51) Int. Cl.
  *G01L 3/00* (2006.01)
(52) U.S. Cl. ........................... 73/862.331; 73/862.191; 73/862.321; 73/862.325; 73/862.332
(58) Field of Classification Search ............ 73/862.191, 73/862.321, 862.325, 862.331, 862.332
See application file for complete search history.

(56) References Cited

U.S. PATENT DOCUMENTS

| | | | |
|---|---|---|---|
| 6,868,743 B2 * | 3/2005 | Nakane et al. | 73/862.331 |
| 6,880,411 B2 * | 4/2005 | Nakane et al. | 73/862.331 |
| 6,928,887 B2 * | 8/2005 | Nakane et al. | 73/862.331 |
| 6,928,888 B2 * | 8/2005 | Nakane et al. | 73/862.332 |
| 7,047,824 B2 * | 5/2006 | Nakane et al. | 73/862.331 |
| 7,051,602 B2 * | 5/2006 | Nakane et al. | 73/862.333 |
| 7,089,809 B2 * | 8/2006 | Nakane et al. | 73/862.331 |
| 7,110,902 B2 * | 9/2006 | Fukaya et al. | 702/99 |
| 7,246,531 B2 * | 7/2007 | Nakane et al. | 73/862.332 |
| 7,293,472 B2 * | 11/2007 | Tokumoto et al. | 73/862.331 |
| 2005/0223820 A1 | 10/2005 | Murakami et al. | |
| 2006/0021451 A1 * | 2/2006 | Ishihara et al. | 73/862.331 |

FOREIGN PATENT DOCUMENTS

| | | |
|---|---|---|
| JP | 2005-265587 A | 9/2005 |
| JP | 2005-300267 A | 10/2005 |

\* cited by examiner

*Primary Examiner*—Edward Lefkowitz
*Assistant Examiner*—Freddie Kirkland, III
(74) *Attorney, Agent, or Firm*—Birch, Stewart, Kolasch & Birch, LLP

(57) ABSTRACT

An inventive torque detection device includes: a magnetic circuit forming member provided at a rotating body to which a torque is applied; a magnetic flux collecting ring for collecting a generated magnetic flux; a detection part for detecting, based on the density of the collected magnetic flux, the torque applied to the rotating body; a holding ring, having a flange, for holding the magnetic flux collecting ring and the detection part; and a sealing ring for sealing between the flange and a housing. The holding ring further has: a concave portion for equalizing the thickness of the holding ring at a region thereof close to the flange; and a prevention wall that is continuous with the flange and brought into contact with an inner circumferential face of the sealing ring so as to prevent the displacement of the sealing ring into the concave portion

7 Claims, 10 Drawing Sheets

FIG. 9
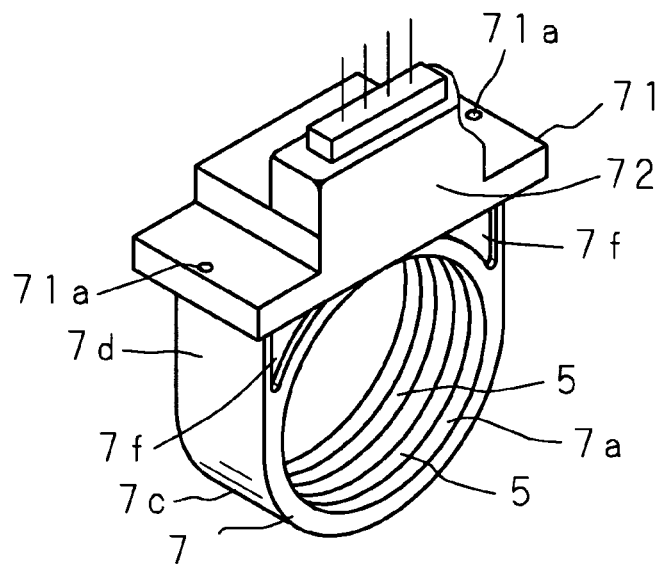
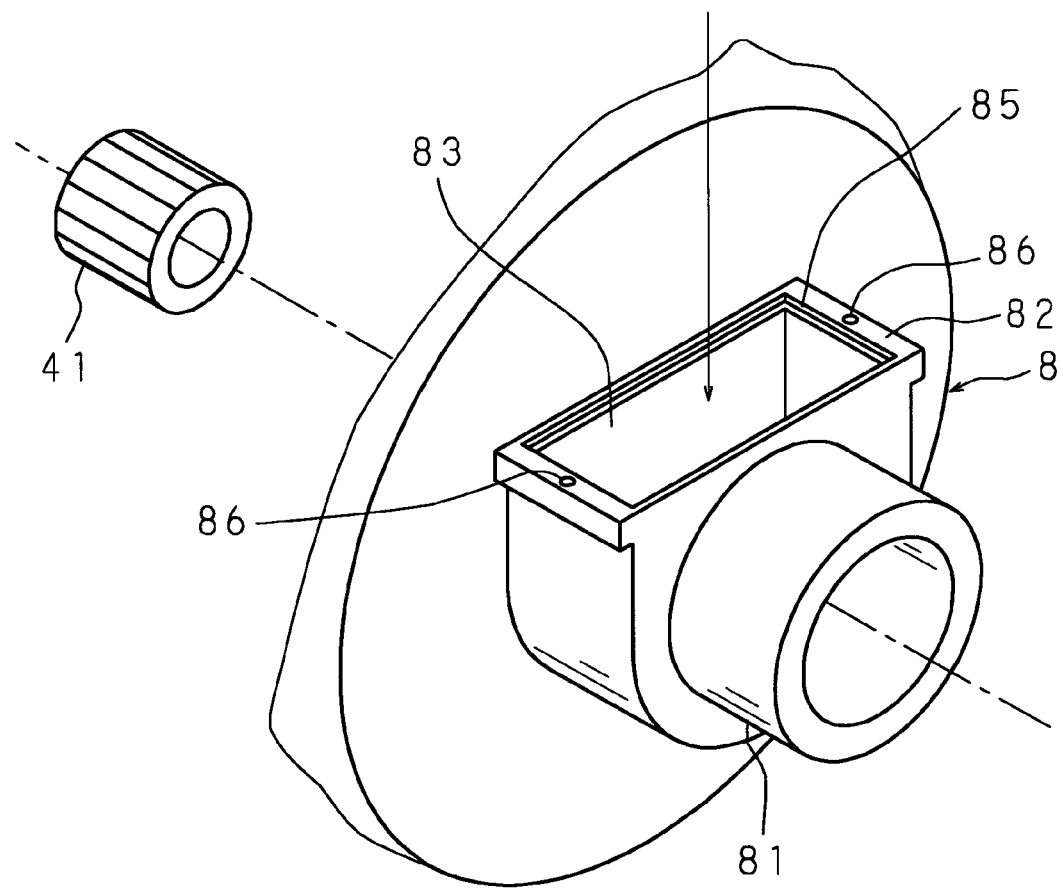

TORQUE DETECTION DEVICE

CROSS-REFERENCE TO RELATED APPLICATIONS

This Nonprovisional application claims priority under 35 U.S.C. § 119(a) on patent application Ser. No. 2006-5277 filed in Japan on Jan. 12, 2006, the entire contents of which are hereby incorporated by reference.

BACKGROUND OF THE INVENTION

The present invention relates to a torque detection device for detecting the torque applied to a rotating body.

An exemplary torque detection device is disclosed in Japanese Patent Application Laid-Open No. 2005-300267, for example. The torque detection device, disclosed in Japanese Patent Application Laid-Open No. 2005-300267, includes: two magnetic flux collecting rings for collecting a magnetic flux generated by a magnetic circuit forming member provided at a rotating body having input and output shafts connected via a torsion bar, the two magnetic flux collecting rings being arranged circumferentially of the magnetic circuit forming member and axially separated from each other; a detection part for detecting the torque applied to the rotating body, based on the density of a magnetic flux collected by each of the magnetic flux collecting rings; and a holding ring, which has a flange, for holding the detection part and the magnetic flux collecting rings by molding the detection part and the magnetic flux collecting rings. And the device is formed so that the flange is attached to a housing by using bolts in the state where the holding ring is inserted into the housing. Further, a sealing ring is located between the flange and the housing so that the sealing ring is sandwiched and fixed therebetween due to the fastening of the bolts, thus sealing between the flange and the housing.

In addition, the holding ring further has: axial both end faces; an approximately semicircular outer circumferential face; and two extended outer surfaces extended tangentially from the outer circumferential face. And the flange is continuous with each of the extended outer surfaces and both the end faces.

BRIEF SUMMARY OF THE INVENTION

However, the torque detection device formed as described in Japanese Patent Application Laid-Open No. 2005-300267 has the following problem. Since the holding ring having the flange is molded with a synthetic resin material, a portion of the holding ring close to the flange is thicker than a portion of the holding ring close to the approximately semicircular outer circumferential face, thus causing sink mark. Therefore, the measures to improve this torque detection device have been desired.

FIG. 1 is a front view showing the constitution of an improved torque detection device. FIG. 2 is an enlarged cross-sectional view taken along the line II-II in FIG. 1. As shown in FIGS. 1 and 2, the applicant of the present invention has developed a torque detection device in which both end faces 102, 102 between two extended outer surfaces 101, 101 of a holding ring 100 are provided with thinned concave portions 105, 105 for equalizing the thickness between each of the extended outer surfaces 101, 101 and a through hole 104 of the holding ring 100, and between a flange 103 and the through hole 104 of the holding ring 100.

The torque detection device formed in this manner can suppress the sink mark of the holding ring 100 without shortening the distance between the two extended outer surfaces 101, 101 of the holding ring 100. However, although a sealing ring 106 is located around the thinned concave portions 105, a portion of the sealing ring 106 facing the thinned concave portions 105 is not brought into contact with the holding ring 100 (see FIG. 2). Therefore, after the torque detection device has been incorporated into a housing 107, the air pressure within the housing 107 might be decreased when a rotating body is built into the housing 107. Or in the state where the torque detection device and the rotating body are built into the housing 107, upon decrease of the air pressure within the housing 107 due to the conditions outside of the housing 107, there occurs a reduction in the pressure inside the thinned concave portions 105 communicated with the inside of the housing 107 via a through hole into which the holding ring 100 is inserted. In such a case, a portion of the sealing ring 106 facing the thinned concave portions 105 might be sucked into the thinned concave portions 105 and fall into the thinned concave portions 105. Furthermore, since both the end faces 102, 102 and the flange 103 of the holding ring 100 are not continuous at the thinned concave portions 105, the flange 103 is likely to undulately deform in the thickness direction due to the temperature change outside of the housing 107, which might partially degrade the sandwiching of the sealing ring 106 by the flange 103 to decrease the sealing property of the sealing ring 106.

The present invention has been made in view of the above-described problems, and its main object is to provide a torque detection device that can prevent the fall of a sealing ring into a thinned concave portion and the deformation of a flange, although the thickness of a holding ring can be equalized by the thinned concave portion.

A torque detection device according to a first aspect of the present invention includes: a magnetic flux collecting ring for collecting a magnetic flux generated by a magnetic circuit forming member provided at a rotating body to which a torque is applied, the magnetic flux collecting ring being located circumferentially of the magnetic circuit forming member; a detection part for detecting, based on a density of the magnetic flux collected by the magnetic flux collecting ring, the torque applied to the rotating body; a holding ring for holding the magnetic flux collecting ring and the detection part, the holding ring having a flange to be attached to an appropriate object; and a sealing ring for sealing between the flange and the object, the device characterized in that the holding ring has: a concave portion formed at a region thereof close to the flange; and a prevention wall that is continuous with the flange and brought into contact with an inner circumferential face of the sealing ring so as to prevent the displacement of the sealing ring into the concave portion.

In the torque detection device according to the first aspect of the present invention, the thickness of the holding ring can be equalized by the existence of the concave portion. Moreover, since the holding ring has the prevention wall that is continuous with the flange and brought into contact with the inner circumferential face of the sealing ring so as to prevent the displacement of the sealing ring into the concave portion, it is possible to prevent the fall of the sealing ring into the concave portion when the air pressure is reduced, and to prevent the deformation of the flange.

The torque detection device according to a second aspect of the present invention is characterized in that the holding ring further has: axial both end faces; an approximately semicircular outer circumferential face; and two extended outer surfaces extended tangentially from the outer circumferential face, and the concave portion is provided at both the end faces.

In the torque detection device according to the second aspect of the present invention, it is possible to suppress the sink mark of the holding ring without shortening the distance between the two extended outer surfaces of the holding ring, and to improve the rigidity of the holding ring.

The above and further objects and features of the invention will more fully be apparent from the following detailed description with accompanying drawings.

BRIEF DESCRIPTION OF THE SEVERAL VIEWS OF THE DRAWINGS

FIG. 9 is a partial exploded perspective view of the torque detection device according to the present invention.

DETAILED DESCRIPTION OF THE INVENTION

Figure 1:
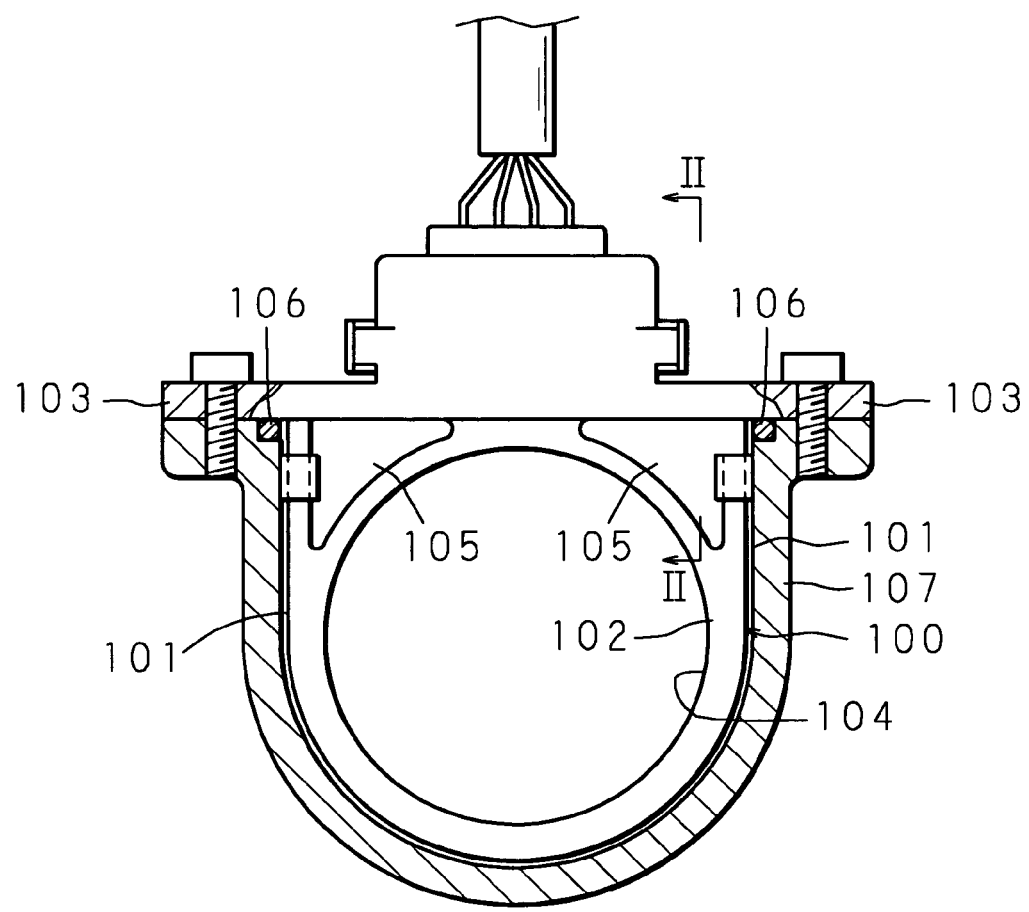
FIG. 1 is a front view showing the constitution of an improved torque detection device.
Figure 2:
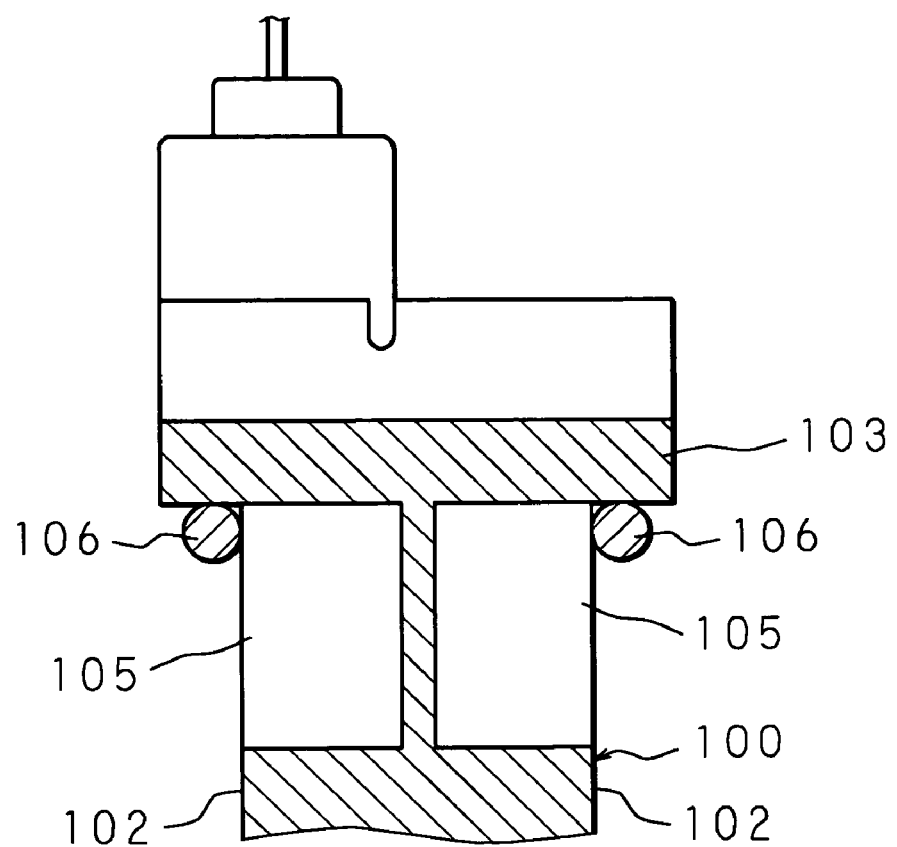
FIG. 2 is an enlarged cross-sectional view taken along the line II-II in FIG. 1.
Figure 3:
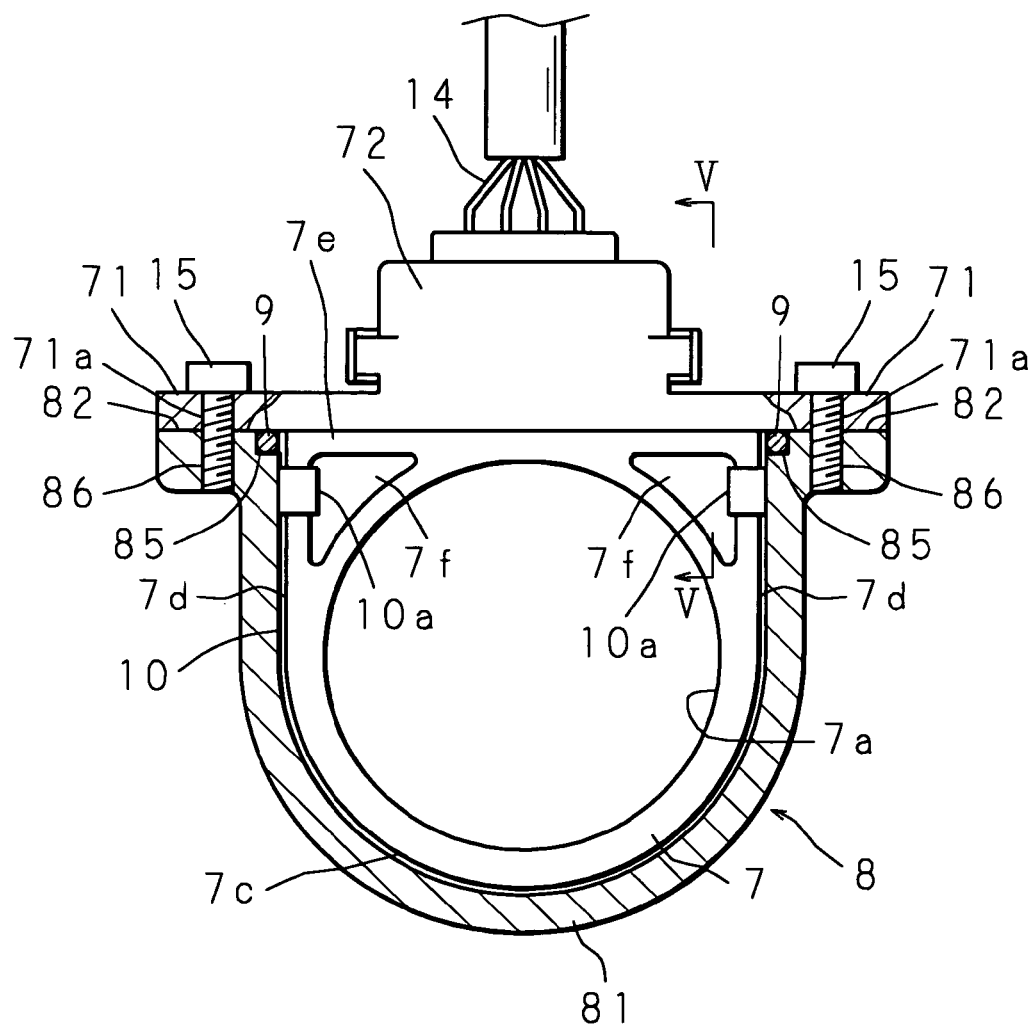
FIG. 3 is a front view of a torque detection device according to the present invention, incorporated into a housing.
Figure 4:
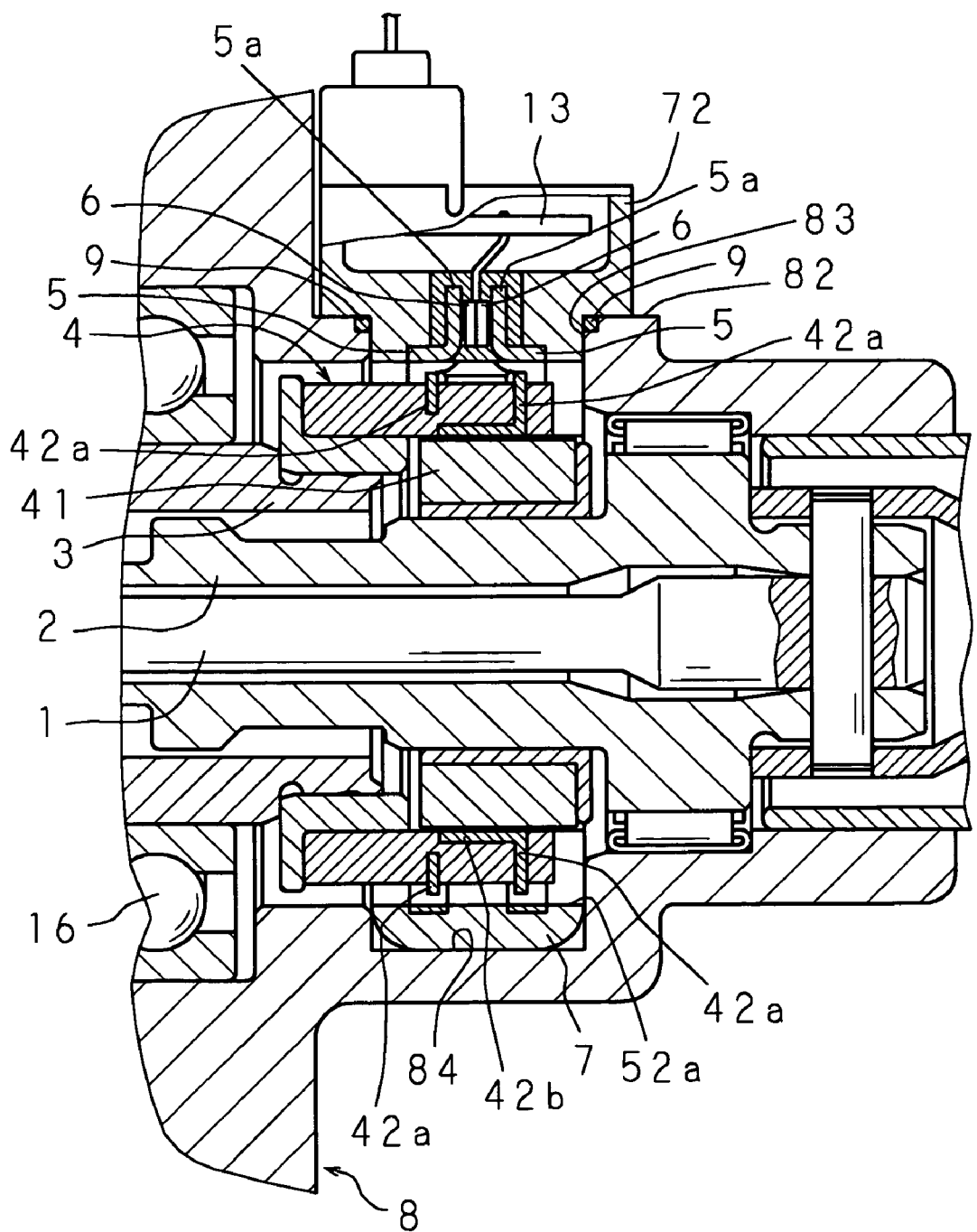
FIG. 4 is a cross-sectional view of the torque detection device according to the present invention, incorporated into the housing.
Figure 5:
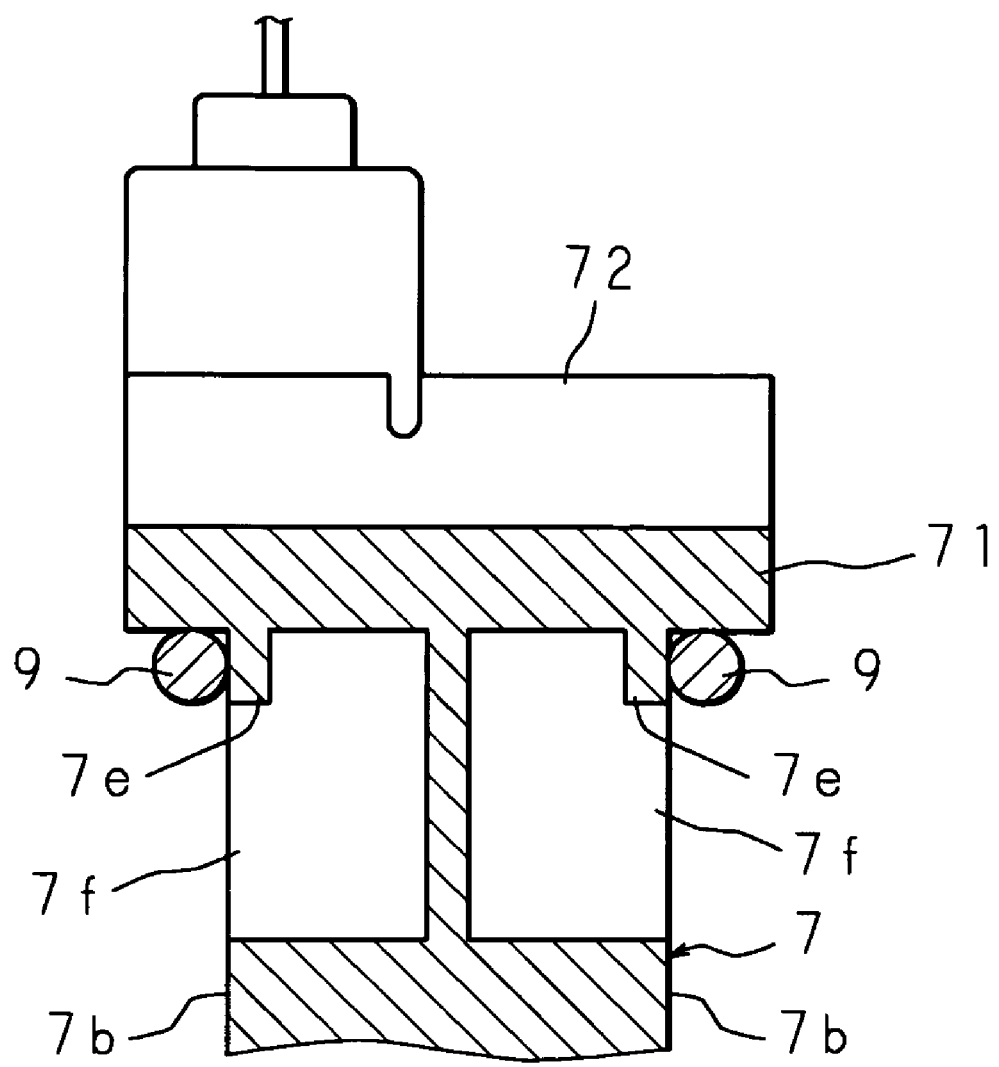
FIG. 5 is an enlarged cross-sectional view taken along the line V-V in FIG. 3.
Figure 6:
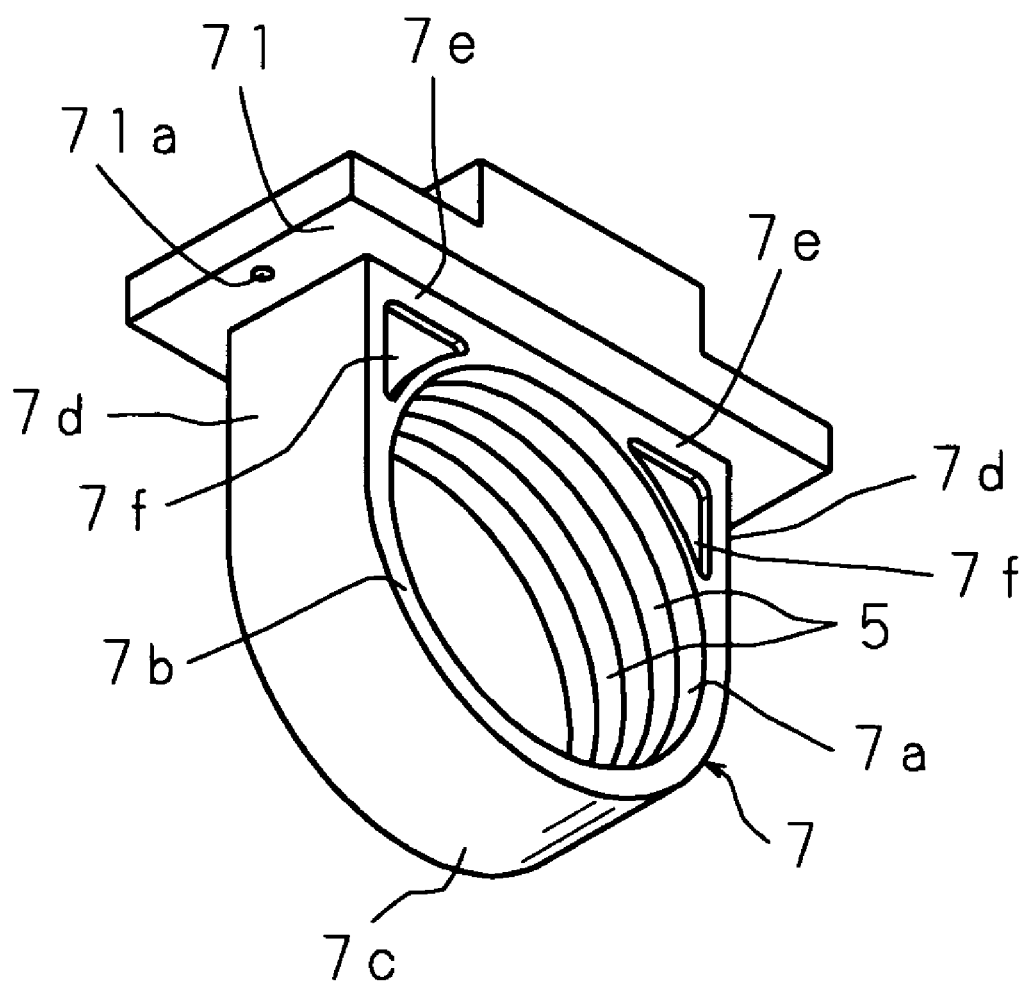
FIG. 6 is a perspective view showing the constitution of the torque detection device according to the present invention.
Figure 7:
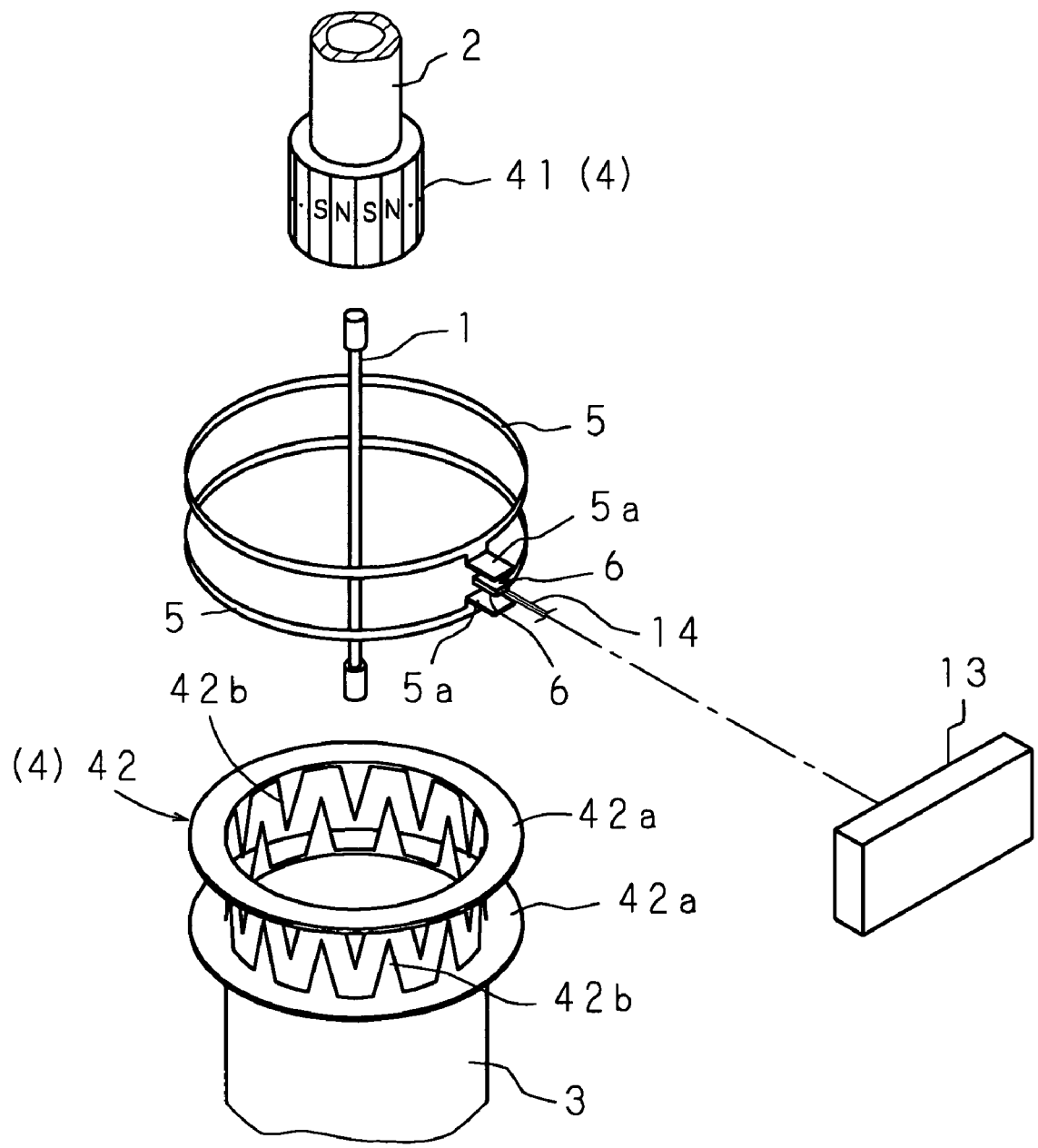
FIG. 7 is a schematic exploded perspective view of the torque detection device according to the present invention.
Figure 8:
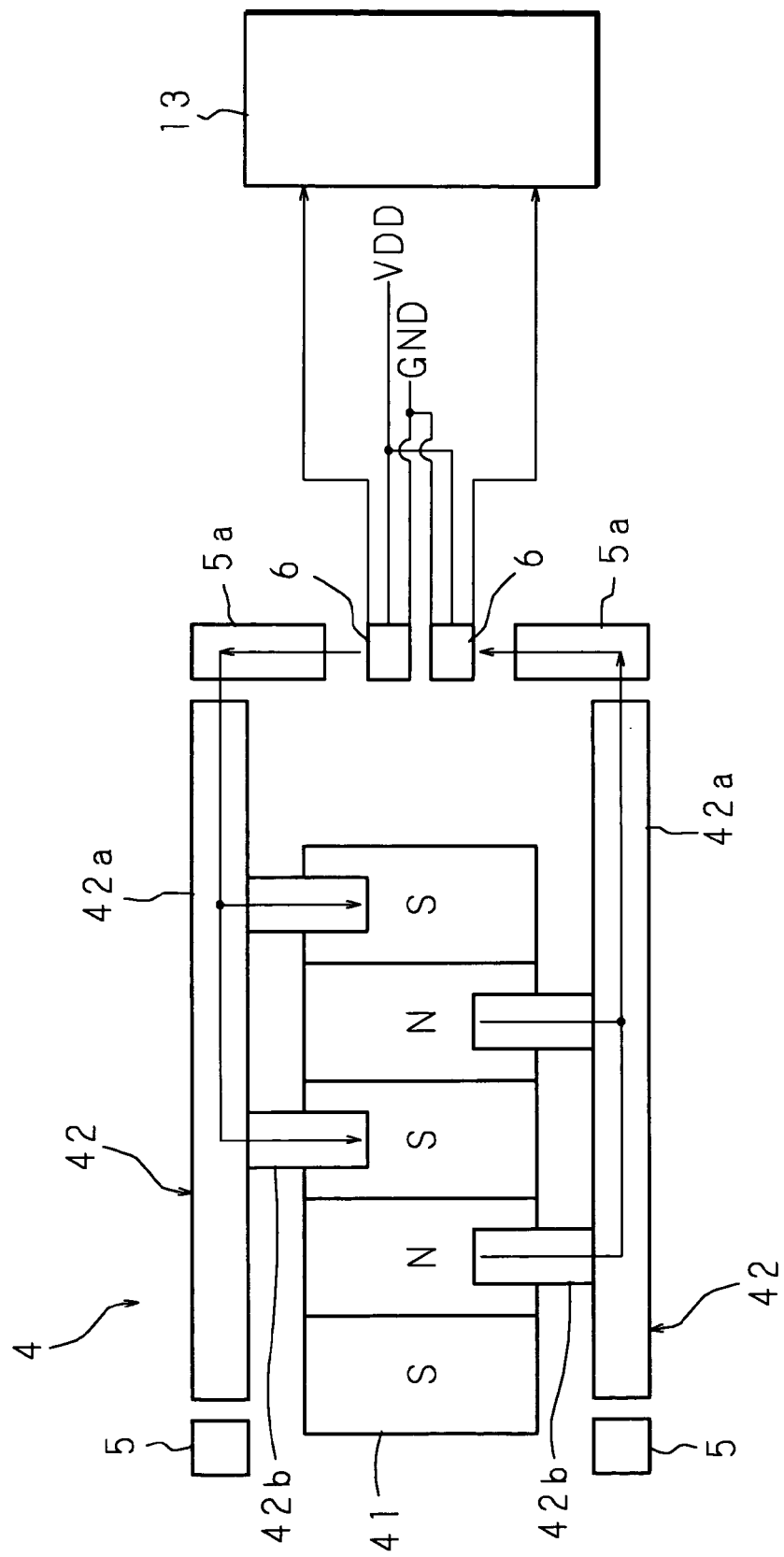
FIG. 8 is a diagram for describing a magnetic circuit generated when a rotating body is rotated in one direction.

Hereinafter, embodiments of the present invention will be described in detail with reference to the drawings. FIG. 3 is a front view of a torque detection device according to the present invention, incorporated into a housing. FIG. 4 is a cross-sectional view of the torque detection device incorporated into the housing 8. FIG. 5 is an enlarged cross-sectional view taken along the line V-V in FIG. 3. FIG. 6 is a perspective view showing the constitution of the torque detection device. FIG. 7 is a schematic exploded perspective view of the torque detection device. FIG. 8 is a diagram for describing a magnetic circuit generated when a rotating body is rotated in one direction. And FIG. 9 is a partial exploded perspective view of the torque detection device.

An inventive torque detection device includes: two magnetic flux collecting rings 5, 5 for collecting a magnetic flux generated by a magnetic circuit forming member 4, which are located circumferentially of the magnetic circuit forming member 4 of first and second rotating bodies 2 and 3 coaxially connected via a torsion bar 1; a detection part 6 for detecting the torque applied to the first rotating body 2, based on the density of a magnetic flux collected by the magnetic flux collecting rings 5, 5; a holding ring 7 for holding the magnetic flux collecting rings 5, 5 and the detection part 6, which has a flange 71 attached to a housing 8 surrounding the magnetic circuit forming member 4; a sealing ring 9 for sealing between the flange 71 and the housing 8; and a magnetic shield plate 10 for covering the outer circumference of the holding ring 7. It should be noted that the magnetic circuit forming member 4 includes: a plurality of permanent magnets 41 attached to an outer circumferential part of the first rotating body 2; and two magnetic rings 42, 42 located circumferentially of the permanent magnets 41 and externally fitted to the second rotating body 3.

The permanent magnets 41 are formed into a multi-pole magnetic ring in which a plurality of north and south poles are alternately arranged circumferentially, and the ring is externally fitted to the outer circumferential part of the first rotating body 2.

The magnetic rings 42, 42 have: two opposing annular plates 42a, 42a separated form each other in the axial direction of the second rotating body 3; and a plurality of comb teeth 42b, 42b extended close to each other from inner circumferential parts of the annular plates 42a, 42a. The magnetic rings 42, 42 are formed so that the magnetic flux density between the magnetic rings 42, 42 is changed due to the relative rotation with the permanent magnets 41. The comb teeth 42b, 42b are arranged at equal intervals such that they intermesh alternately in the circumferential direction, and the magnetic rings 42, 42 are molded with a synthetic resin material in the state where the comb teeth 42b, 42b intermesh alternately, thus providing a molded body.

The magnetic flux collecting rings 5, 5 form a cylindrical shape having convex pieces 5a, 5a extended radially outward from circumferential portions of the magnetic flux rings 5, 5 so as to be located on both sides of the detection part 6, thus allowing the convex pieces 5a, 5a to collect a magnetic flux. Moreover, the magnetic flux collecting rings 5, 5 are a formed magnetic plate such as a steel plate, and are located so as to be axially separated from each other.

The holding ring 7 holds the magnetic flux collecting rings 5, 5 by molding the magnetic flux collecting rings 5, 5 with a synthetic resin material. This holding ring 7 has a through hole 7a corresponding to inner circumferential faces of the magnetic flux collecting rings 5, 5, and the magnetic flux collecting rings 5, 5 are fitted to the through hole 7a. In addition, the holding ring 7 further has: axial both end faces 7b, 7b; an approximately semicircular outer circumferential face 7c; and two extended outer surfaces 7d, 7d extended tangentially from the outer circumferential face 7c. The circumferential face of the holding ring 7 between both the end faces 7b, 7b is approximately U-shaped, and the extended side of each of the extended outer surfaces 7d, 7d has a rectangular cross section. The flange 71 having a cuboid shape at the extended ends of the extended outer surfaces 7d, 7d, a rectangular cylindrical part 72 protruded at the center of the flange 71, and the holding ring 7 are integrally molded with a synthetic resin material.

At the flange 71 side of both the end faces 7b, 7b, a plurality of concave portions 7f for equalizing the thickness of the holding ring 7 are provided. In addition, the holding ring 7 is further provided with a prevention wall 7e that is continuous with the flange 71 and brought into contact with an inner circumferential face of the sealing ring 9 so as to prevent the displacement of the sealing ring 9 into the concave portions 7f (see FIGS. 3 and 5). The concave portions 7f are each formed into an approximately triangular shape and are recessed axially from both the end faces 7b, 7b. The prevention wall 7e is formed to have a width substantially similar to the thickness of the sealing ring 9 along the inner circumferential face of the sealing ring 9, and is continuous with a base end of the flange 71 so that an opening of each concave portion 7f is partially closed.

The flange 71 has a plate-like shape that forms a cuboid, and the flange 71 is provided, at its circumferentially distributed two portions, with insertion holes 71a, 71a through which small screws are to be inserted. Inside the rectangular cylindrical part 72, a detection circuit board 13 connected to the detection part 6 is molded with a synthetic resin material, and a conductor 14 is connected to the detection circuit board 13.

The detection part 6 includes a Hall element whose electrical characteristic (resistance) varies in accordance with a change in the magnetic flux density generated between the convex pieces 5a, 5a of the magnetic flux collecting rings 5, 5, and is configured so as to change a detection signal in accordance with a change in the magnetic flux density generated between the convex pieces 5a, 5a of the magnetic flux collecting rings 5, 5. A detection signal from the detection part 6 is sent to the detection circuit board 13. It should be noted that other than a Hall element, the detection part 6 may alternatively have a magnetic sensing element whose electrical characteristic (resistance) varies due to a magnetic field effect, such as a magnetoresistance effect element (MR element); therefore, a constituent element of the detection part 6 is not limited to a Hall element.

The magnetic shield plate 10 is approximately U-shaped in a manner corresponding to the shapes of the outer circumferential face 7c and the extended outer surfaces 7d, 7d, and is formed by a flexible nonmagnetic member such as a silicon steel plate. Further, at both ends of the magnetic shield plate 10, engaging pieces 10a, 10a that are engaged with the concave portions 7f by calking are protruded (see FIG. 3).

The housing 8 as an appropriate object has: a cylindrical part 81 surrounding the magnetic circuit forming member 4; an attachment seat 82 which is protruded at a portion of an outer circumferential part of the cylindrical part 81, and to which the holding ring 7 is to be attached; a through hole 83 that radially passes through the attachment seat 82 and that forms a rectangular cross section for allowing the holding ring 7 to be located inside the cylindrical part 81; and a fitting groove 84 that is continuous with the through hole 83 and is bent in a manner corresponding to the shape of the holding ring 7 (see FIG. 4).

The attachment seat 82 is formed into a rectangular annular shape in a manner corresponding to the shape of the flange 71, and an annular groove 85 for accommodating the sealing ring 9 is provided at an inner portion of the attachment seat 82. Furthermore, at an outer portion of the attachment seat 82, two screw holes 86, 86 corresponding to the insertion holes 71a, 71a are provided.

In the torque detection device constructed as described above, the sealing ring 9 is externally fitted and held at the flange 71 side of the holding ring 7, and the holding ring 7 is inserted into the cylindrical part 81 through the through hole 83 that passes through the attachment seat 82 of the housing 8. Furthermore, by allowing the holding ring 7 to engage with the fitting groove 84, the position of the holding ring 7 inside the cylindrical part 81 is determined, and the sealing ring 9 is brought into contact with the annular groove 85 so that the sealing ring 9 is sandwiched and fixed between the flange 71 and the attachment seat 82. After the holding ring 7 has been inserted into the housing 8 in this manner, small screws 15, 15 are fastened into the screw holes 86, 86 through the insertion holes 71a, 71a of the flange 71, thus attaching the holding ring 7 to the attachment seat 82 (see FIGS. 3 and 4).

After the torque detection device has been attached to the housing 8 as described above, a component, such as the rotating bodies 2, 3 provided with the magnet circuit forming member 4 and a sealed bearing 16 for rotatably supporting the rotating bodies 2, 3, is inserted into the housing 8 from the axial direction of the housing 8, thus providing the assembly in which the inside of the housing 8 is sealed. Therefore, during the assembly, the air pressure inside the housing 8 might be reduced. In such a case, due to this air pressure reduction, the air pressure inside the concave portions 7f, slightly communicated with the inside of the housing 8 via the through hole 83, might be also reduced. However, the holding ring 7 is provided with the prevention wall 7e that is brought into contact with the inner circumferential face of the sealing ring 9 to prevent the displacement of the sealing ring 9 into the concave portions 7f, and the inner circumferential face of the sealing ring 9 is brought into contact with the prevention wall 7e. Therefore, the adverse influence of the thinned concave portions 7f is eliminated, thus making it possible to prevent the displacement and fall of the sealing ring 9 into the concave portions 7f.

Moreover, the torque detection device constructed as described above may be used as an electrical power steering device for a vehicle, for example. In that case, the device is disposed in an area exposed to water splashed from outside the vehicle or water for washing the vehicle; therefore, when the temperature inside the housing 8 is sharply reduced due to the splashed water or water for washing the vehicle, the air pressure inside the concave portions 7f, slightly communicated with the inside of the housing 8 via the through hole 83, is also reduced. However, since the holding ring 7 is provided, at its portions facing the concave portions 7f, with the prevention wall 7e, and the inner circumferential face of the sealing ring 9 is brought into contact with the prevention wall 7e, the adverse influence of the thinned concave portions 7f is eliminated, thus making it possible to prevent the displacement and fall of the sealing ring 9 into the concave portions 7f.

Furthermore, since the prevention wall 7e is continuous with the flange 71 for the attachment of the holding ring 7 to the housing 8, the flange 71 is reinforced with the prevention wall 7e. Accordingly, the flange 71, molded integrally with the holding ring 7 using a synthetic resin material, can be prevented from being deformed in the thickness direction, the surface of the flange 71 in contact with the sealing ring 9 can be kept flat, the sandwiching force applied to the sealing ring 9 can be equalized, and the sealing property of the sealing ring 9 can be improved.

Figure 10:
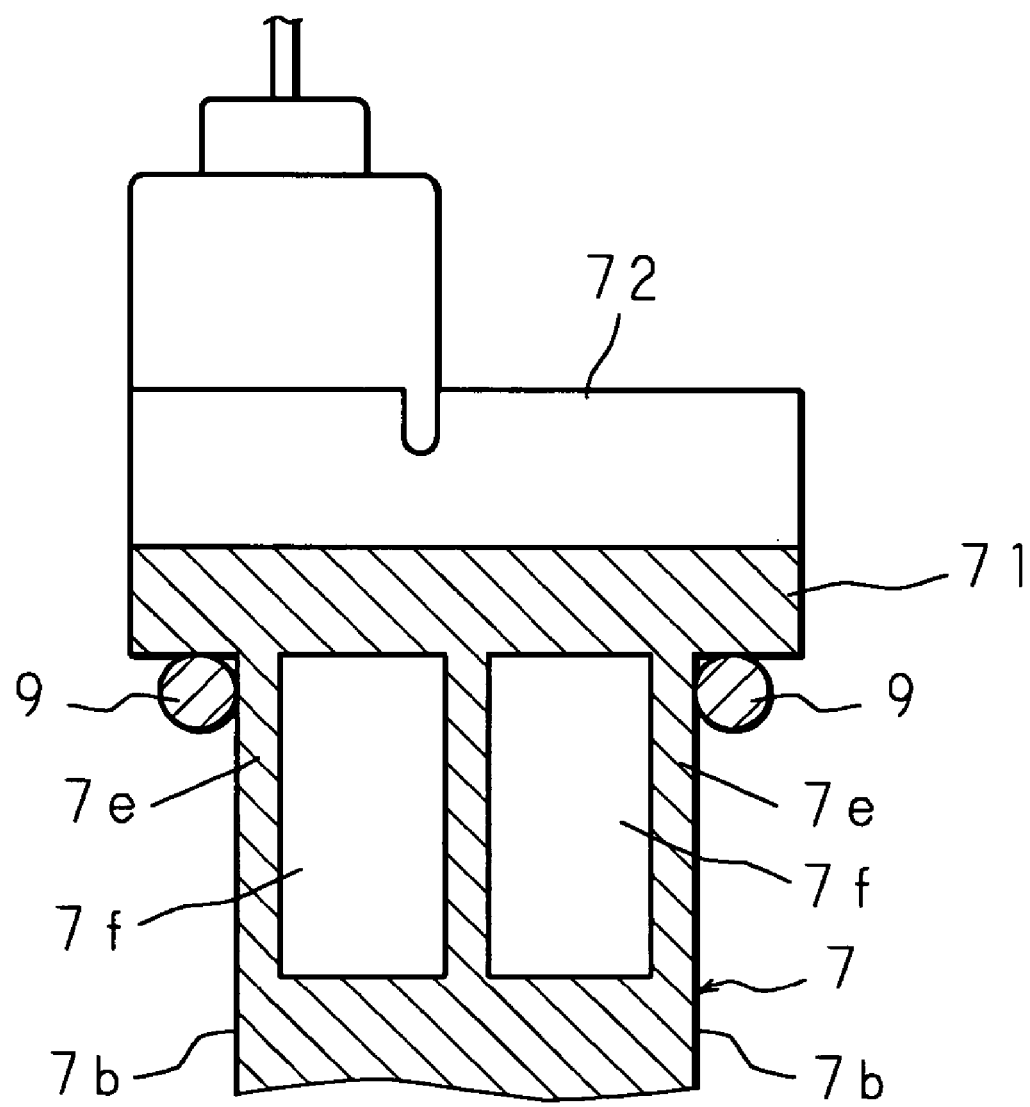
FIG. 10 is an enlarged cross-sectional view of the principal part of the torque detection device according to the present invention, showing another constitution thereof.

FIG. 10 is an enlarged cross-sectional view of the principal part of the torque detection device, showing another constitution thereof. Although the concave portions 7f are recessed axially from both the end faces 7b, 7b of the holding ring 7 according to the above-described embodiment, the concave portions 7f may alternatively be formed such that openings located close to both the end faces 7b, 7b are closed and sealed, for example.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A torque detection device comprising:
a magnetic circuit forming member provided at a rotating body to which a torque is applied;
a magnetic flux collecting ring for collecting a magnetic flux generated by the magnetic circuit forming member, the magnetic flux collecting ring being located circumferentially of the magnetic circuit forming member;

a detection part for detecting, based on a density of the magnetic flux collected by the magnetic flux collecting ring, the torque applied to the rotating body;

a holding ring for holding the magnetic flux collecting ring and the detection part, the holding ring having a flange to be attached to an appropriate object; and a sealing ring for sealing between the flange and the object, wherein the holding ring has: a concave portion formed at a region thereof close to the flange; and a prevention wall that is continuous with the flange and brought into contact with an inner circumferential face of the sealing ring so as to prevent the displacement of the sealing ring into the concave portion.

2. The torque detection device according to claim 1, wherein the holding ring further has: axial both end faces; an approximately semicircular outer circumferential face; and two extended outer surfaces extended tangentially from the outer circumferential face, and the concave portion is provided at both the end faces.

3. The torque detection device according to claim 2, wherein the concave portion is formed into an approximately triangular shape, and is recessed axially from both the end faces.

4. The torque detection device according to claim 1, wherein the prevention wall is formed to have a width substantially similar to a thickness of the sealing ring along the inner circumferential face of the sealing ring.

5. The torque detection device according to claim 1, wherein an opening of the concave portion is partially closed by the prevention wall.

6. The torque detection device according to claim 2, wherein an opening of the concave portion located close to both the end faces is closed by the prevention wall.

7. The torque detection device according to claim 1, wherein the holding ring holds the magnetic flux collecting ring and the detection part by molding the magnetic flux collecting ring and the detection part with a synthetic resin material.

* * * * *